United States Patent
Nakamura

(10) Patent No.: US 7,920,453 B2
(45) Date of Patent: Apr. 5, 2011

(54) OPTICAL INFORMATION RECORDING/REPRODUCTION APPARATUS AND RECORDING CONDITION ADJUSTING METHOD

(75) Inventor: Masaru Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 269 days.

(21) Appl. No.: 12/309,032

(22) PCT Filed: Jun. 27, 2007

(86) PCT No.: PCT/JP2007/062905
§ 371 (c)(1),
(2), (4) Date: Jan. 5, 2009

(87) PCT Pub. No.: WO2008/004478
PCT Pub. Date: Jan. 10, 2008

(65) Prior Publication Data
US 2009/0303853 A1 Dec. 10, 2009

(30) Foreign Application Priority Data
Jul. 3, 2006 (JP) ................. 2006-183379

(51) Int. Cl.
*G11B 7/00* (2006.01)
(52) U.S. Cl. ............ 369/59.22; 369/59.12; 369/59.16
(58) Field of Classification Search ............ 369/53.11, 369/53.35, 59.11, 59.12, 59.15, 59.16, 59.21, 369/47.53, 47.21
See application file for complete search history.

(56) References Cited

U.S. PATENT DOCUMENTS

| | | | |
|---|---|---|---|
| 6,754,160 B2 | 6/2004 | Kashihara et al. | |
| 7,215,624 B2 | 5/2007 | Kashihara | |
| 7,440,372 B2 * | 10/2008 | Nakano et al. ............. | 369/53.12 |
| 2003/0021204 A1 | 1/2003 | Kashihara | |
| 2003/0090980 A1 | 5/2003 | Kashihara et al. | |
| 2003/0137914 A1 | 7/2003 | Kashihara et al. | |
| 2004/0095862 A1 | 5/2004 | Nakajima et al. | |
| 2005/0185559 A1 | 8/2005 | Moro et al. | |

(Continued)

FOREIGN PATENT DOCUMENTS

JP 2002-319133 A 10/2002

(Continued)

OTHER PUBLICATIONS

English-Language Translation of Form PCT/IPEA/409.

*Primary Examiner* — Nabil Z Hindi
(74) *Attorney, Agent, or Firm* — McGinn IP Law Group, PLLC

(57) ABSTRACT

An adaptive equalization circuit (105) operates for PR-equalization of the reproduced signal that is subjected to an A/D conversion by an A/D converter (103) and shaped by a waveform shaping circuit (104). An ideal-waveform generation circuit (110) generates an ideal waveform that corresponds to the reproduced signal that is binarized by a Viterbi-decoding circuit (108). A mark-length/space-length calculation circuit (112) calculates the actual mark length/space length relative to the mark length/space length to be formed, based on the equalization error that arises when the ideal waveform assumes a central reference level as calculated by an equalization-error calculation circuit (111) and the intervals of polarity inversions of binarized data detected by a 0-cross detection circuit (109). A system controller (114) adjusts the edge shift quantity of the recording waveform when forming a mark based on the calculated mark length/space length.

4 Claims, 11 Drawing Sheets

U.S. PATENT DOCUMENTS

| | | |
|---|---|---|
| 2006/0083135 A1 | 4/2006 | Minemura |
| 2006/0104178 A1 | 5/2006 | Nakajo |
| 2006/0203679 A1 | 9/2006 | Kashihara et al. |

FOREIGN PATENT DOCUMENTS

| | | |
|---|---|---|
| JP | 2003-123402 A | 4/2003 |
| JP | 2003-151219 A | 5/2003 |
| JP | 2003-196838 A | 7/2003 |
| JP | 2005-222634 | 8/2005 |
| JP | 2005-243087 A | 9/2005 |
| JP | 2006-120208 | 5/2006 |
| JP | 2006-164486 | 6/2006 |
| WO | WO02/084653 | 10/2002 |

\* cited by examiner

3T REPETITIVE WAVEFORM FOR PR1221

3T REPETITIVE WAVEFORM FOR PR121/P12221

OPTICAL INFORMATION RECORDING/REPRODUCTION APPARATUS AND RECORDING CONDITION ADJUSTING METHOD

TECHNICAL FIELD

The present invention relates to an optical information recording/reproduction apparatus and a recording condition adjusting method. More particularly, the present invention relates to an optical recording/reproduction apparatus for optically recording information on/from an optical information recording medium and a recording condition adjusting method adjusting the recording conditions of such an apparatus.

BACKGROUND ART

Optical information recording/reproduction apparatus (optical disk drive) for recording/reproducing information on/from an optical information recording medium (optical disk) have been popular in use. An optical disk drive encodes the data to be recorded by means of any of a variety of coding systems and classifies the data into a plurality of marks and a plurality of spaces to have a binary state before actually recording the information on the optical disk. When reproducing data, it detects the mark length/space length of each of the marks/spaces formed on the optical disk from the reproduced signal to read the recorded data and decodes the data by means of the appropriate coding system before actually reproducing the data. It is to be noted that the symbol "/" such as used in "recording/reproducing apparatus" and "mark length/space length" means "and/or" in this text.

When recording data on an optical disk, the mark length/space length to be formed can often be different from the actually formed mark length/space length due to thermal interference etc. If the mark length/space length formed on an optical disk differs from the mark length/space length to be formed, a jitter phenomenon takes place at the time of data reproduction and adversely affects the data reproduction performance. When the jitter is significant, an error state occurs frequently to reduce the reproduction quality of the reproduced data. Such a situation is described in detail in the Republished Patent WO2002/084653. According to the Patent Publication, the edge shift quantity of a mark formed on an optical disk is determined by measuring the jitter of a reproduced signal and the recording parameters are adjusted according to the determined edge shift quantity.

The above Patent Publication shows an example of using PRML (partial response most likelihood), according to which the equalization error of a PR-equalized signal from level-0 is detected at each crossing (0-cross) of a central reference level (level-0) and hence at each polarity inversion of a PR-equalized signal. At this stage, with respect to combinations of mark and space, the marks and space are classified into mT marks (m is an integer not less than 1, and T is a channel clock) and nT spaces (n=an integer not less than 1, T=a channel clock) to detect an equalization error. Subsequently, the jitter quantity is determined by determining the cumulative value of the equalization errors from level-0, each of which takes place at each polarity inversion, and dividing the number of occurrences of equalization errors by the cumulative value. Thereafter, the position of the leading edge of the mark to be recorded and the position of the trailing edge of the mark to be recorded are adjusted to determine the edge shift quantity that minimizes the jitter at the time of reproduction and optimizes the recording conditions. Then, the mark is recorded again under the optimized recording conditions. The inventor of the present invention investigated degradation of the reproduction quality of reproduced data in the manner as described hereinafter.

According to the above Patent Publication, the cumulative value of the equalization errors, each of which is observed when a PR-equalized signal crosses level-0, is determined to by turn determine the jitter. The operation of determining the cumulative value of the equalization errors from level-0, each of which takes place as the level difference of an PR-equalized signal from level-0, is meaningful when the clock sampling point of an ideal waveform agrees with a central reference level (level-0) in a transition from a mark to a space or vice versa for a PR class. However, the clock sampling point of an ideal waveform does not necessarily agree with a central reference level (level-0) depending on the PR class. If such is the case, it is not possible to correctly measure the jitter by means of the technique described in the above Patent Publication.

FIG. 13 schematically illustrates how a 3 T repetitive waveform shifts for PR1221. FIG. 14 schematically illustrates how a 3 T repetitive waveform shifts for PR121 or PR12221. As shown in FIG. 13, the ideal waveform is at a level-0 at the time of sampling thereof for PR1221. However, as shown in FIG. 14, the ideal waveform is not at level-0 at the time of sampling thereof for PR121 and PR12221. According to the above Patent Publication, it is not possible to correctly determine the jitter and the recording conditions cannot be appropriately adjusted for a PR class where the ideal waveform is not always at level-0 at the time of sampling thereof as shown in FIG. 14.

Thus, the technique described in the above Patent Publication is applicable to a PR class where the ideal waveform is at level-0, whereas the technique is not applicable to any PR class where the ideal waveform is not at level-0. If the difference between the position and the length of the formed mark/space and the position and the length of ideal mark/space can be determined from a reproduced signal, the recording conditions can be adjusted equally in a similar way for PR classes where the ideal waveform is at level-0 and for PR classes where the ideal waveform is not at level-0.

DISCLOSURE OF THE INVENTION

It is therefore an object of the present invention to provide an optical information recording/reproduction apparatus that can calculate the shift in a time axis direction of a mark/space from a reproduced signal and accordingly adjust the recording conditions and also a method of adjusting the recording conditions in order to dissolve the above identified problems of the prior art.

In order to achieve the above object, the present invention provides an optical information recording/reproduction apparatus for recording data as combinations of marks and spaces on an information recording medium and reproducing the data from the information recording medium, including: reproduced-waveform-information generation means that generates reproduced waveform information based on a reproduced signal read out from the information recording medium; conversion means that calculates at least one of a formational position shift quantity of a leading edge and a trailing edge of a mark/space and a mark length/space length, formed on the information recording medium, based on the reproduced waveform information; and adjustment means that adjusts an edge shift quantity of the leading edge and the trailing edge of the mark/space at the time of recording based on the at least one of the calculated formational position shift quantity and the mark length/space length.

The present invention provides a method of adjusting recording conditions of an optical information recording/reproduction apparatus for recording data as combinations of marks and spaces on an information recording medium and reproducing the data from the information recording medium, including: a reproduced-waveform-information generation step of reading a reproduced signal from the information recording medium to generate reproduced waveform information based on the reproduced signal read out from the information recording medium; a time-length calculation step of calculating at least one of the formational position shift quantity of the leading edge and the trailing edge of the mark/space and the mark length/space length, formed on the information recording medium, based on the reproduced waveform information; and an adjustment step for adjusting the edge shift quantity of the leading edge and the trailing edge of the mark/space at the time of recording based on at least one of the calculated formational position shift quantity and the mark length/space length.

The above and other objects, features and advantages of the present invention will be more apparent from the following description referring to the accompanying drawings.

BEST MODE FOR CARRYING OUT THE INVENTION

Figure 1:
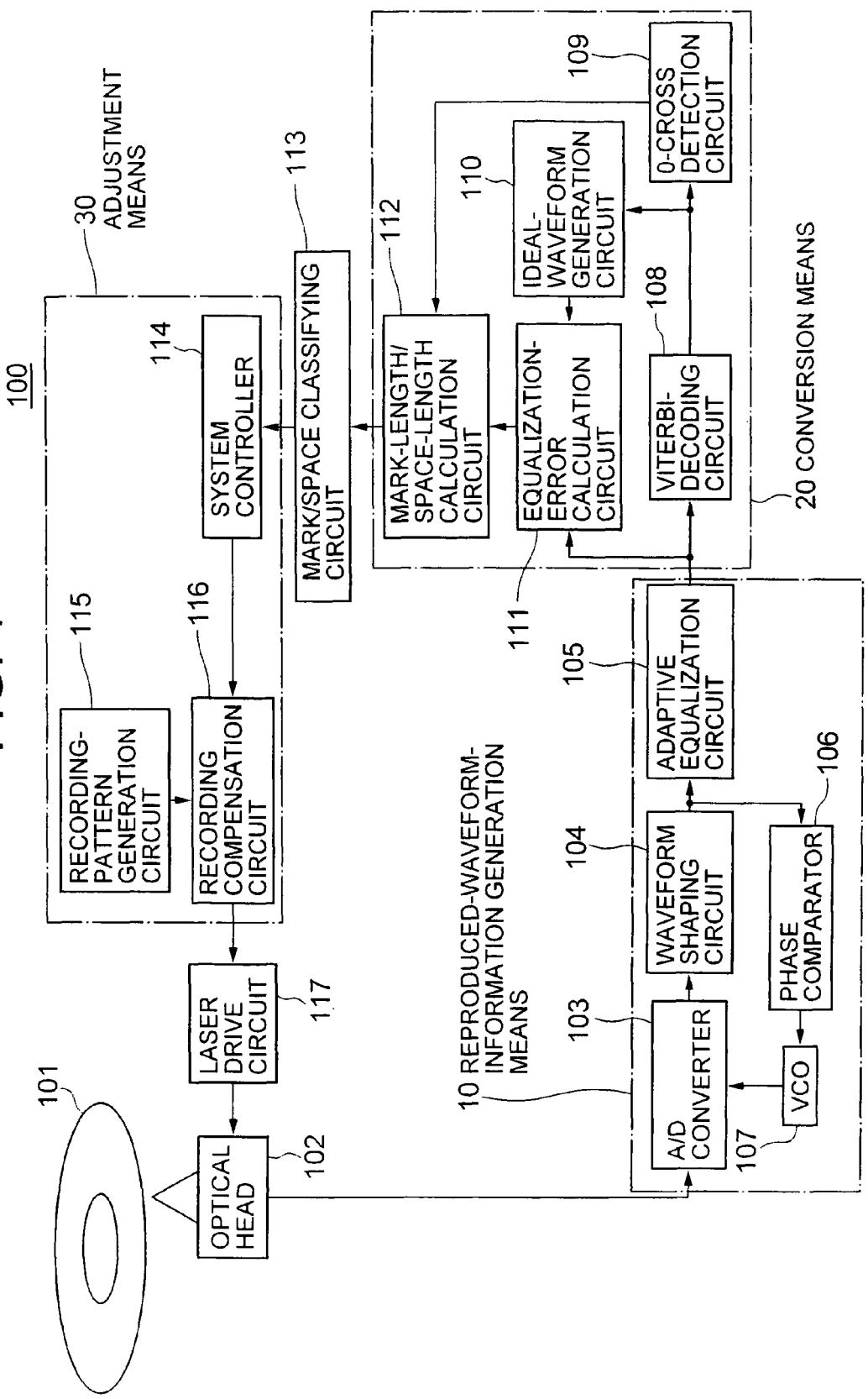
FIG. 1 is a diagram of the configuration of an optical disc drive according to a first exemplary embodiment of the present invention.

Now, the present invention will be described in greater detail with reference to the accompanying drawings. Throughout the drawings, similar elements are denoted by similar reference symbols for a better understanding of the present invention. FIG. 1 is a block diagram of the configuration of an optical disc drive according to a first exemplary embodiment of the present invention. The optical disk drive 100 includes an optical head 102, an A/D converter 103, a waveform shaping circuit 104, an adaptive equalization circuit 105, a phase comparator 106, a VCO 107, a Viterbi decoding circuit 108, a 0-cross detection circuit 109, an ideal-waveform generation circuit 110, an equalization-error calculation circuit 111, a mark-length/space-length calculation circuit 112, a mark/space classifying circuit 113, a system controller 114, a recording-pattern generation circuit 115, a recording compensation circuit 116 and a laser drive circuit 117. The A/D converter 103, the waveform shaping circuit 104, the adaptive equalization circuit 105, the phase comparator 106 and the VCO 107 configure a reproduced-waveform-information generation means 10. The Viterbi decoding circuit 108, the 0-cross detection circuit 109, the ideal-waveform generation circuit 110, the equalization-error calculation circuit 111 and the mark-length/space-length calculation circuit 112 configure a conversion means 20. The system controller 114, the recording-pattern generation circuit 115 and the recording compensation circuit 116 configure an adjustment means 30.

The optical head 102 irradiates a laser bam to an optical disk 101 and obtains a reproduced signal from light reflected by the optical disk 101. The A/D converter 103 converts the reproduced signal obtained by the optical head 102 into a digital data having a predetermined bit width. The reproduced and digitized signal is equalized to a desired PR class by the adaptive equalization circuit 105 by way of a waveform shaping circuit 104, which may typically be a high pass filter. In this exemplary embodiment, it is assumed that a PR class for which the clock sampling point of an ideal waveform agrees with a central reference level (0-level) in a transition from a mark to a space or vice versa. The VCO 107 supplies a clock signal (sampling clock) to the entire processing circuit including the A/D converter 103. The clock signal that the VCO 107 supplies is so controlled by the phase comparator 106 as to reduce the phase difference between the periodical information obtained from the reproduced signal and the clock signal.

The Viterbi decoding circuit 108 operates for Viterbi-decoding the output of the adaptive equalization circuit 105 and generates the most probable binarized data. The 0-cross detection circuit 109 detects a 0-cross of the binarized data generated by the Viterbi decoding circuit 108 and detects a polarity inversion of the binarized data. The ideal-waveform generation circuit 110 generates an ideal waveform according to the binarized data produced by Viterbi-decoding by means of PR characteristics. The equalization-error calculation circuit 111 calculates an equalization error from the difference between the adaptive equalization waveform (reproduced and equalized signal) output from the adaptive equalization circuit 105 and the ideal waveform data generated by the ideal-waveform generation circuit 110. The equalization error is ideally equal to 0; however it is not necessarily equal to 0 if such a state exists locally. Generally speaking, the state of recording is not suitable as a whole when the equalization error is large and suitable as a whole when the equalization error is small.

Roughly speaking, the equalization error is substantially equal to "0" when the mark length/space length to be formed and the actually recorded mark length/space length agree with each other. The equalization error is believed to show a value that is proportional to the shift quantity of the actually recorded mark length/space length from the mark length/space length to be formed. Thus, in this exemplary embodiment, the equalization error is converted into a mark length/space length, which is then employed to adjust the edge shift quantity of the leading edge and the trailing edge of the mark and the space.

The equalization-error calculation circuit 111 converts the calculated equalization error into a T length (T length: a length expressed by using a unit of channel clock) and calculates the shift quantity from the position where a mark/space is to be formed for the leading edge and the trailing edge of the mark/space. The mark-length/space-length calculation circuit 112 calculates the actual mark length/space length relative to the mark length/space length to be formed based on the intervals (T length) of polarity inversions that the 0-cross detection circuit 109 detects. The mark/space classifying circuit 113 classifies the shift quantity at the leading edge and the trailing edge calculated by the mark-length/space-length calculation circuit 112 for each mark length/space length or for each combination of a predetermined mark length and a predetermined space length.

The system controller 114 calculates the shift quantity at the leading edge and the trailing edge and the average and the variances and so on of the mark lengths/space lengths of each classification made by the mark/space classifying circuit 113 and defines the parameters of recording conditions for a suitable recording relative to the recording pattern output from the recording-pattern generation circuit 115 in the recording compensation circuit 116. The laser drive circuit 117 drives a laser according to the write strategy defined by the recording compensation circuit 116 and executes a recording process onto the optical disk 101 by way of the optical head 102.

Figure 2:
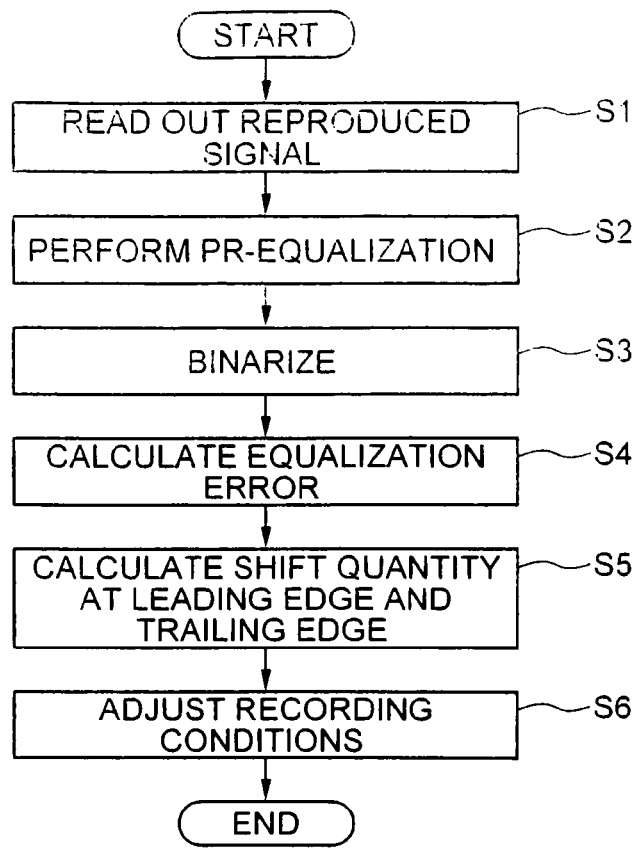
FIG. 2 is a flowchart showing the sequence of operation of the optical disk drive of FIG. 1 during adjusting the recording conditions.

FIG. 2 is a flowchart showing the sequence of operation of the optical disk drive for adjusting the recording conditions. The optical head 102 irradiates a laser bam to the optical disk 101 and detects light reflected from the optical disk 102 to obtain a reproduced signal (Step S1). The reproduced signal is converted into a digital data by the A/D converter 103 and subsequently input to the adaptive equalization circuit 105 by way of the waveform shaping circuit 104, where it is PR-equalized (Step S2). The reproduced and PR-equalized signal (adaptively equalized waveform) is turned into a binary data by the Viterbi-decoding circuit 108 (Step S3). The ideal-waveform generation circuit 110 generates an ideal waveform according to the data binarized by the Viterbi-decoding circuit 110, and the equalization-error calculation circuit 111 calculates the equalization error between the ideal waveform and the adaptively equalized waveform when the ideal waveform assumes the central reference level (Step S4) and inputs the same to the mark-length/space-length calculation circuit 112.

The mark-length/space-length calculation circuit 112 converts the equalization error calculated by the equalization-error calculation circuit 111, converts the same into a mark length/space length and calculates the shift quantity at the leading edge and the trailing edge of the mark/space (Step S5). At this stage, the mark-length/space-length calculation circuit 112 measures the time intervals of detections of 0-cross by the 0-cross detection circuit 109 and recognizes the value of the mark length/space length for which the calculated equalization error corresponds to the leading edge or the trailing edge. When converting the equalization error into a mark length/space length, the mark-length/space-length calculation circuit 112 selects the ratio of the equalization error to the value of the ideal waveform at the time one clock preceding or succeeding the time when it assumes the central reference level, which is the quantity of the transition to or from the central reference level, as the time length relative to the equalization error. The actual mark length/space length relative to the mark length/space length to be formed can be determined from the time length and the intervals of detection times of 0-cross by the 0-cross detection circuit 109.

The optical disk drive 100 continuously repeats the steps from Step S1 to Step S5 to obtain the shift quantity at the leading edge and the trailing edge of each mark length/space length and the actual mark length/space length relative to the mark length/space length to be formed. The mark/space classifying circuit 113 accumulates the shift quantity at the leading edge and the trailing edge and the mark length/space length for each mark/space or for each combination of a predetermined mark length and a predetermined space length. The averages are obtained by dividing the total sum of the accumulated shift quantities and the total sum of the accumulated mark lengths/space lengths by the number of samples.

The system controller 114 defines the parameters of recording conditions according to the shift quantity at the leading edge and the trailing edge of mark/space classified by the mark/space classifying circuit 113 or the actual mark length/space length relative to the mark length/space length to be formed (Step S6). In Step S6, for example, when defining recording conditions for forming a 3 T mark, the mark/space classifying circuit 113 defines the parameters of recording conditions such as the parameter for determining the position for irradiating a recording pulse, utilizing the shift quantity at the leading edge or the trailing edge of the 3 T mark or the actually formed mark length relative to the 3 T mark to be recorded.

Figure 3:
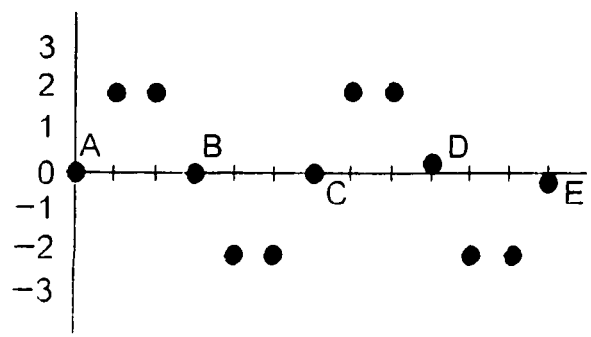
FIG. 3 is a waveform diagram showing adaptive equalization data corresponding to a 3 T repetitive waveform.

Now, a specific example will be described below. FIG. 3 shows an adaptive equalization data corresponding to a 3 T repetitive waveform for PR1221. In FIG. 3, the horizontal axis indicates a time axis. The value of the adaptive equalization data is equal to "0" at points A, B and C, which agrees with the central reference level so that the equalization error is equal to "0" at each of those points. The 0-cross detection circuit 109 detects the 0-cross at points A, B and C and the mark-length/space-length calculation circuit 112 recognizes that the mark length/space length is equal to 3 T from point A to point B and from point B to point C based on the time intervals of detections of 0-cross. The mark-length/space-length calculation circuit 112 calculates that the shift quantity is also equal to "0" and the mark length (or the space length) from point A to point B and the space length (or the mark length, whichever appropriate) from point B to point C are exactly equal to 3 T because the equalization error is equal to "0" at each of points A, B and C.

It is assumed here that the time interval from point C to point D is equal to 3 T and the adaptive equalization data is +0.2. This indicates a state where the value needs to be changed by "−2" from the time point that precedes point D by 1 T so as to become equal to the central reference level and yet actually it is changed only by "−1.8" from the time point that precedes point D by 1 T so that the value needs to be changed further by "0.2". This means that the trailing edge of the mark is shifted in the direction that increases the mark length at point D and hence the mark length corresponding to from point C to point D is greater than 3 T and the length of the succeeding space is decreased accordingly. The equalization error of "0.2" is converted into a length and the distance by which the mark length is increased (shift quantity of trailing edge of mark) is determined to be 0.2/2=0.1 T because the quantity of the original transition is "2". Therefore, the actual mark length from point C to point D is equal to "3.1T", which is longer than the time length of "3 T" detected by the 0-cross detection circuit 109 by "0.1 T".

Now, it is assumed that the time interval from point D to point E is equal to 3 T and the adaptive equalization data at point E is −0.1. This indicates a state where the value needs to be changed by "2" from the time point that precedes point E by 1 T so as to become equal to the central reference level and yet actually it is changed only by "1.9" from the time point that precedes point E by 1 T so that the value needs to be changed further by "0.1". This means that the trailing edge of the mark is shifted in the direction that increases the space length at point E. The equalization error of "−0.1" is converted into a length at point E and the distance by which the space length is increased is determined to be 0.1/2=0.05 T. Here, the equalization error is equal to "+0.2" at point D and the position of the leading edge of the space is shifted to decrease it by 0.1 T because the position of the trailing edge is shifted by 0.1 T at point D to increase the mark length. Therefore, the actual space length from point D to point E is equal to 3 T−0.1 T+0.5 T=2.95 T.

Figure 4:
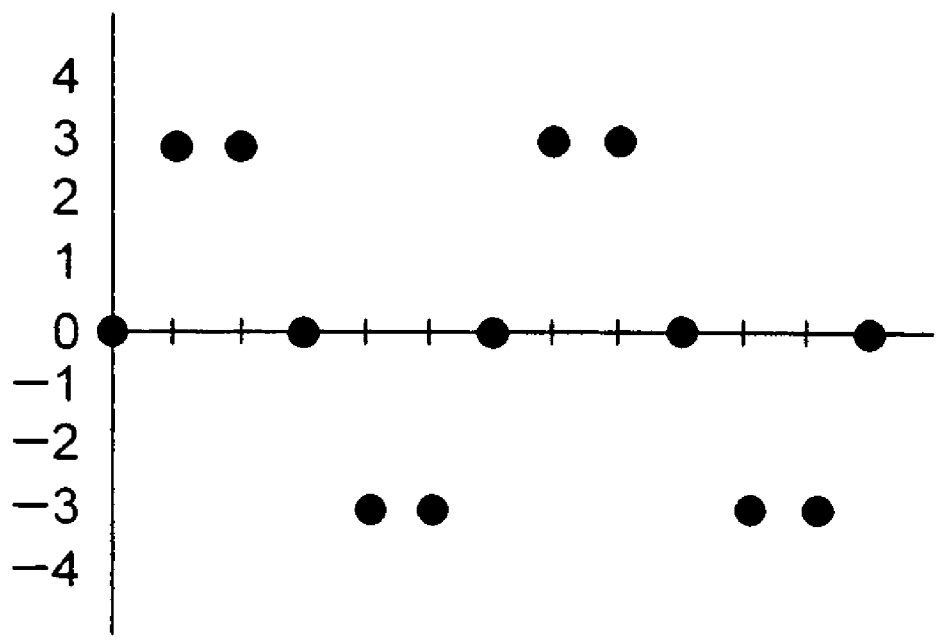
FIG. 4 is a waveform diagram showing a 3 T repetitive waveform.
Figure 13:
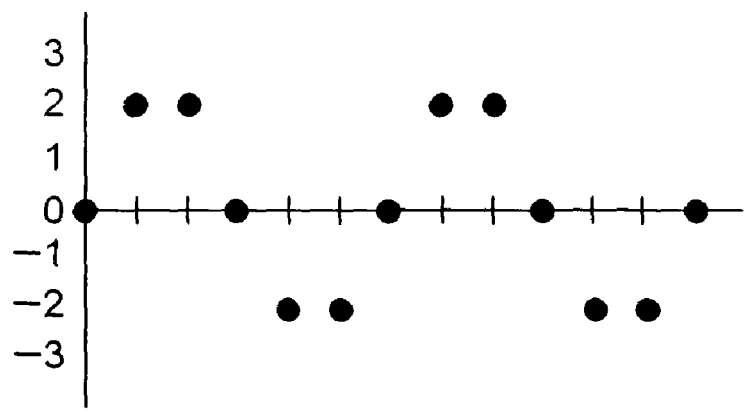
FIG. 13 is a waveform diagram showing level changes of a T repetitive waveform.
Figure 14:
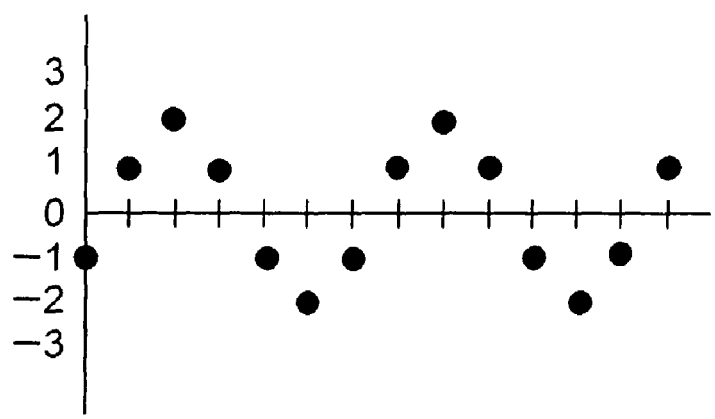
FIG. 14 is a waveform diagram showing level changes of another 3 T repetitive waveform.

The relationship between the equalization error and the mark length or the space length that is increased/decreased changes as a function of the quantity of the transition to the central reference level from the time point preceding by 1 T, or the quantity of the transition from the central reference level to the time point succeeding it by 1 T. In other words, it changes as a function of the PR class. FIG. 4 shows a 3 T repetitive waveform for PR1331. The ideal waveform for PR1221 (FIG. 13) shifts from the level value of 0 to ±2, whereas the ideal waveform for PR1331 shifts from level value of 0 to ±3. In other words, the value of the change that should take place is equal to "3" in a period of 1 T. In this case, it is sufficient for the mark-length/space-length calculation circuit 112 to change the denominator of the above conversion formula to "3". Thus, if the equalization error is equal to "0.2", the equalization error is converted to 0.2/3=0.67 T. In this way, the mark-length/space-length calculation circuit 112 appropriately changes the conversion formula according to the PR class and yet the principle of dividing the equalization error by the quantity of the transition from the 0-cross point in a 1 T period does not change.

The mark/space classifying circuit 113 classifies the shift quantity at the leading edge and the trailing edge of the mark/space calculated by the mark-length/space-length calculation circuit 112 for each mark length/space length. For example, it discriminately stores the shift quantities at the leading edges and the trailing edges for the 3 T mark, the 3 T space, the 4 T mark, the 4 T space and so on. Instead or additionally, the mark/space classifying circuit 113 classifies the mark length/space length calculated from the shift quantity at the leading edge and the trailing edge of the mark/space for each category of mark length/space length. Thus, the mark/space classifying circuit 113 discriminately stores the calculated mark lengths/space lengths for each category of mark length/space length (3 T, 4 T, 5 T, . . . ) to be formed.

When classifying mark lengths/space lengths, the mark/space classifying circuit 113 discriminates the shift quantity at the leading edge and the trailing edge and the actual mark length/space length based on the intervals of polarity inversions detected by the 0-cross detection circuit 109. Alternatively, the mark/space classifying circuit 113 may adopt the value of (the integer closest to the actual mark length/space length)×T when it discriminates the actual mark length/space length the mark-length/space-length calculation circuit 112 calculated as the mark length to be formed. For example, if the calculated mark length is 3.1 T, it adopts 3 T as the mark length to be formed because 3 T is the integer closest to 3.1.

For classifying mark lengths/space lengths, the mark length/space length classifying circuit 113 may be adapted to operate for finer discrimination, using combinations of mark lengths and space lengths. For example, when storing the actual mark length that is calculated for a 3 T mark to be formed, it is discriminated further by the immediately succeeding space, which may be any of 3 T, 4 T, 5 T, . . . Similarly, when storing the actual space length, it is classified by means of the combination with the mark length of the immediately succeeding mark and the shift quantity at the leading edge and the trailing edge and the space length are stored.

The shift quantity at the leading edge and the trailing edge of a mark/space as calculated by the mark-length/space-length calculation circuit 112 and the actually formed mark length/space length relative to the mark length/space length to be formed show whether the mark/space is suitable or not suitable, whereby whether the current recording operation is conducted ideally or not can be determined based on them. The system controller 114 defines (adjusts) the parameters of recording conditions based on the shift quantity at the leading edge and the trailing edge of the mark/space and the actual mark length/space length. At this stage, the system controller 114 executes a statistic process on the shift quantity of each mark length/space length and the actual mark length/space length and determines the average and the variances to determine the quantities to be used for adjusting the recording conditions.

Additionally, for example, when the mark length of a 6 T mark that is actually formed is already classified for the corresponding 6 T mark to be formed by the mark/space classifying circuit 113, the system controller 114 determines whether the mark length of the actual 6 T mark is longer or shorter than the mark length of the mark 6 T to be formed and defines the recording conditions so as to allow the recording mark to exactly show the mark length of 6 T. It may be so arranged that the mark/space classifying circuit 113 compares the equalization error at the time corresponding to the leading edge of the mark against the equalization error at the time corresponding to the trailing edge of the mark and selects the larger equalization error for adjusting the recording conditions.

Figure 5:
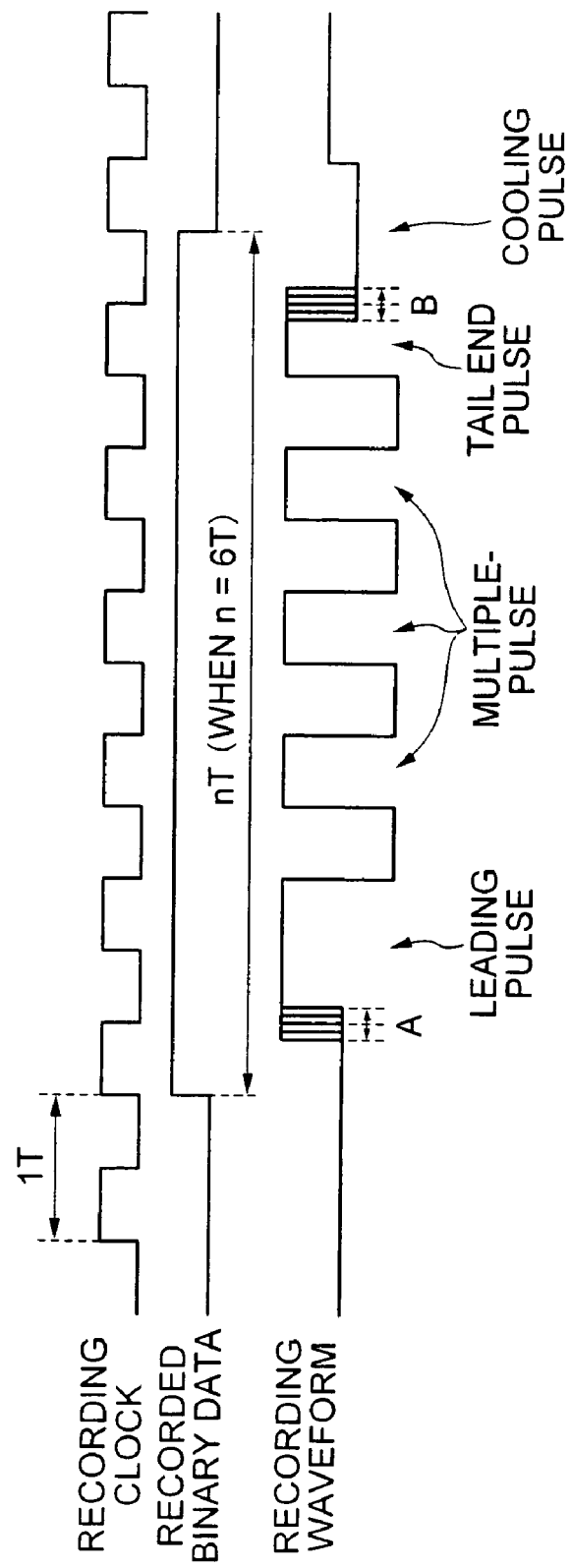
FIG. 5 is a timing chart showing a specific example of recorded binary data and recorded waveform.

FIG. 5 shows a specific example of recorded binary data and recorded waveform. In this example, a 6 T mark is formed by irradiating a plurality of pulses. The starting position (A) of the leading pulse and the ending position (B) of the tail end pulse of the plurality of pulses are taken into consideration for determining the parameters of recording conditions. When the shift quantity of the leading edge and the trailing edge is already classified by the mark/space classifying circuit 113, the staring position of the leading pulse and the ending position of the tail end pulse are adjusted so as to bring the leading edge and the trailing edge of the 6 T mark to desired respective positions. Additionally, when the actual mark length of the recorded 6 T mark is 6.2 T, the staring position of the leading pulse and the ending position of the tail end pulse are adjusted so as to make the recording mark length equal to 6 T.

The parameters of recording conditions are also defined with respect to the leading edge and the trailing edge of each recording mark other than 6 T. When changing the parameters of recording conditions by means of combinations of marks and spaces, the parameters of recording conditions may be defined by using the shift quantity at the leading edge and the trailing edge of each combination of mark length/space length classified by the mark/space classifying circuit 113 and the actual mark length/space length. The parameters of recording conditions that are defined in this way are then set in the recording compensation circuit 116 and reflected to the write strategy for the next recording operation.

In this exemplary embodiment, the equalization-error calculation circuit 111 calculates the equalization error when an ideal waveform assumes the central reference level and the mark-length/space-length calculation circuit 112 converts the equalization error into the direction of length. The length obtained as a result of the conversion represents the quantity of the positional shift relative to the mark/space to be formed and the system controller 114 adjusts the parameters of recording conditions based on the length obtained as a result of the conversion. Thus, the recording conditions can be optimized in this exemplary embodiment so that the recorded data can be reproduced with a high reproduction quality by forming marks and spaces of desired mark lengths/space lengths in this way.

Figure 6:
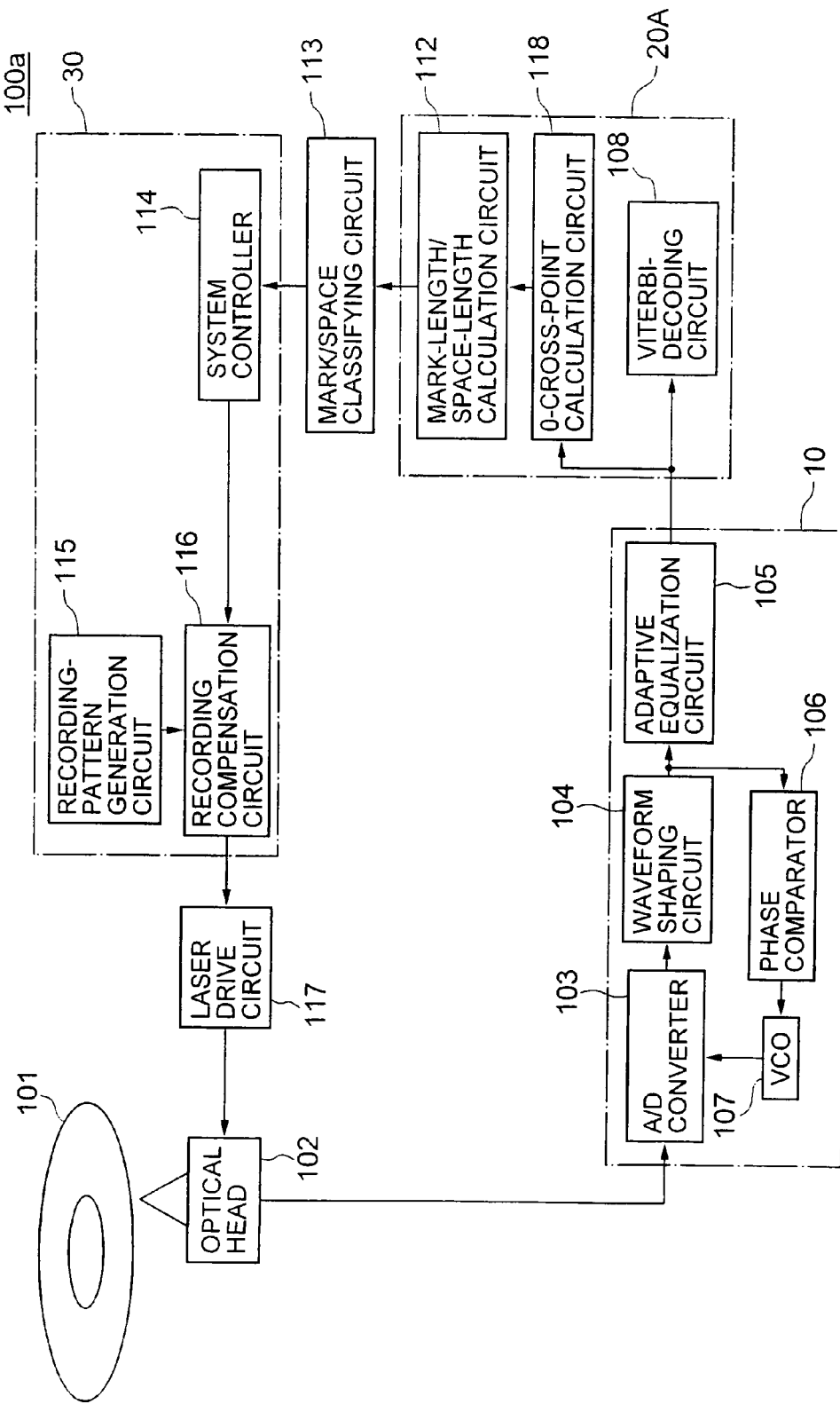
FIG. 6 is a block diagram of the configuration of an optical disc drive according to a third exemplary embodiment of the present invention.

FIG. 6 is a block diagram of the configuration of an optical disc drive according to a second exemplary embodiment. In this exemplary embodiment, it is assumed that a PR class for which the clock sampling point of an ideal waveform doe not necessarily agree with a central reference level (0-level) in a transition from a mark to a space or vice versa. The optical disk drive 100a of this exemplary embodiment differs from the optical disk drive 100 of FIG. 1 in that the conversion circuit 20A includes a 0-cross-point calculation circuit 118 to replace the 0-cross detection circuit 109, the ideal-waveform generation circuit 110 and the equalization-error calculation circuit 111 shown in FIG. 1. It is to be noted that this exemplary embodiment does not need a 0-cross detection circuit 109, an ideal-waveform generation circuit 110 and an equalization-error calculation circuit 111.

The 0-cross-point calculation circuit 118 calculates the time point when the adaptive equalization data is estimated to cross the 0-level based on the value of the adaptive equalization data output from the adaptive equalization circuit 105. When calculating the time point, the 0-cross-point calculation circuit 118 firstly acquires the values before and after a value that changes to cross the center of amplitude, or the central reference level, from the adaptive equalization data. Thereafter, it calculates the quantity of the change in the adaptive equalization data before and after (1 T period) crossing the 0-level from the acquired values, or the gradient of the straight line connecting the values before and after the change. Thereafter, it calculates the difference between the time point before or after the change and the time point of crossing the 0-level from the value before or after the change, and the gradient.

Figure 7:
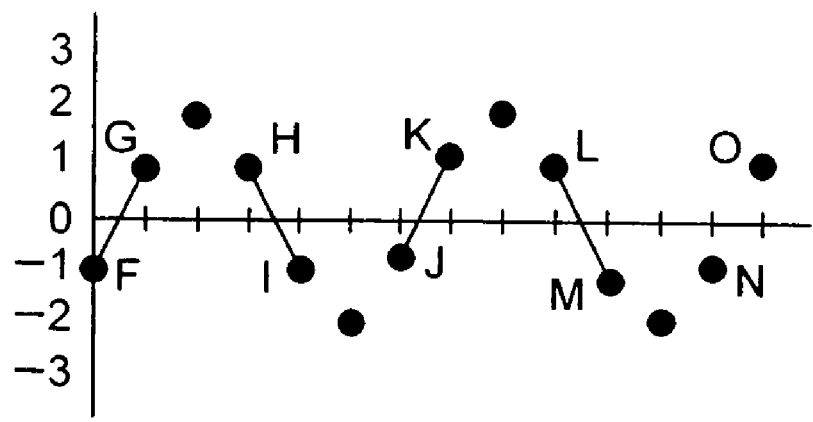
FIG. 7 is a waveform diagram showing a 3 T repetitive waveform.

FIG. 7 shows a 3 T repetitive waveform for PR121 or PR12221. At PR121 or PR12221 (referred to only as PR121 hereinafter), the 3 T repetitive waveform ideally changes to assume the values of −1, 1, 2, 1, −1, −2 and 1 and does not assume the value of the central level (0-level). The 0-cross-point calculation circuit 118 calculates (estimates) the time point of crossing the 0-level, or the value becomes equal to "0", based on the values before and after the inversions of the sign of the adaptive equalization data that changes in this way from the positive sign to the negative sign or vice versa. If the values of the adaptive equalization data at point F and point G are respectively "−1" and "+1", the gradient of the straight line connecting these two points is calculated as 1−(−1)/1=2. Therefore, the time point when the straight line connecting the two points crosses the 0-level is calculated as −(−1)/2=0.5 T from the time point that corresponds to point F. Similarly, if the values of the adaptive equalization data at point H and point I are respectively "+" and "−1", the gradient of the straight line connecting these two points is calculated as −1−(1)/1=−2. Therefore, the time point when the straight line connecting the two points crosses the 0-level is calculated as −1/(−2)=0.5 T from the time point that corresponds to point H.

If the value of the adaptive equalization data at point J is "−0.9" and that of the adaptive equalization data at point K is "+1.1", the gradient of the straight line connecting these two point is +1.1−(−0.9)/1=2. Then, the time point when the straight line connecting point J and point K crosses "0" is −(0.9)/2=0.45 T from the time point that corresponds to point J. Similarly, if the value of the adaptive equalization data at point L is "+1.0" and that of the adaptive equalization data at point M is "−1.1", the gradient of the straight line connecting these two point is equal to "−2.1". Then, the time point when the straight line connecting point L and point M crosses "0" is −(1.0)/(−2.1)=0.4762 T from the time point that corresponds to point L.

Now, the time point when the waveform (ideal waveform) crosses the 0-level in an ideal state is considered. For PR121, the waveform crosses the 0-level when the value of the adaptive equalization data changes from −1 to +1 and also crosses the 0-level when the value changes from +1 to −1. The time point of crossing the 0-level will change as a function of the levels before and after a change of crossing the 0-level. For PR121, both of the absolute values of the levels before and after a change of crossing the 0-level are "1" and hence the time point when the ideal waveform crosses the 0-level is the time point at the middle of the time point that corresponds to −1 and the time point that corresponds to +1, which is the time point of 0.5 T from the time point that corresponds to −1. In a similar way, the time point when the ideal waveform crosses the 0-level when the value changes from +1 to −1 is determined as the time point of 0.5 T from the time point that corresponds to +1.

The difference between the time point when the ideal waveform crosses the 0-level and the time point when the adaptive equalization data crosses the 0-level that is calculated represents the shift quantity of the mark/space. For example, referring to FIG. 7, both the time point of crossing the 0-level between point F and point G and the time point of crossing the 0-level between point H and point I are the time point of 0.5 T from the time points that correspond to point F and point H, respectively. These time points agree with the time points when the ideal waveform crosses the 0-level. Therefore, no positional shift occurs to the mark/space. To the contrary, the time point of crossing the 0-level between point J and point K and the time point of crossing the 0-level between point L and point M are the time point of 0.45 T from the time point that corresponds to point J and the time point of 0.4762 T from the time point that corresponds to point L, respectively, and hence a positional shift takes place from the proper positions (0.5 T). In such a case, a mark/space can be formed with a desired mark length/space length by adjusting the parameters of recording conditions based on the shift quantities from the proper positions so as to minimize the positional shift of the mark/space.

As for the mark length/space length, the mark length from the time point that corresponds to somewhere between point F and point G to the time point that corresponds to somewhere between point H and point L can be determined as 0.5 T+2 T+0.5 T=3 T because the time points of crossing the 0-level are the time points when 0.5 T elapses from point F and point H, respectively. The space length from the time point that corresponds to somewhere between point H and point I to the time point that corresponds to somewhere between point J and point K can be determined as 0.5 T+2 T+0.45 T=2.95 T because the time point of crossing the 0-level between point J and point K that corresponds to the trailing edge of the space is the time point when 0.45 T elapses from the time point that corresponds to point J. The mark length from the time point that corresponds to somewhere between point J and point K that correspond to the mark leading edge to the time point that corresponds to somewhere between point L and point M can be determined as 0.55 T+2 T+0.4762 T=3.0262 T because the time point of crossing the 0-level between point J and point K that corresponds to the leading edge of the mark is the time point when 1-0.45=0.55 T elapses from the time point that corresponds to point K and the time point of crossing the 0-level between point L and point M is the time point when 0.4576 T elapses from the time point that corresponds to point L.

In this exemplary embodiment, the time point when the waveform of the adaptive equalization data crosses the 0-level is estimated from the values of the adaptive equalization data before and after a change that takes place to cross the 0-level and the time point when the waveform crosses the 0-level within the period of 1 T during which the value of the adaptive equalization data changes is calculated. Then, the shift quantity at the leading edge and the trailing edge of the mark/space is determined from the time difference between the time point when the waveform crosses the 0-level that is calculated and the time point when the waveform is supposed to cross the 0-level that is defined for the PR class and the parameters of recording conditions are adjusted based on the determined shift quantity. Alternatively, the actual mark length/space length is calculated relative to the mark length/space length to be formed and the parameters of recording conditions are adjusted accordingly. While any PR class assumes the 0-level in this exemplary embodiment, the value of the adaptive equalization data is converted into the direction of the time axis to determine the shift quantity of the mark/space at the leading edge and the trailing edge thereof and the actual mark length/space length so that the recording conditions can be adjusted by subsequently following a sequence similar to that of the first exemplary embodiment to improve the reproduction quality of recorded data at the time of reproducing them.

Figure 8:
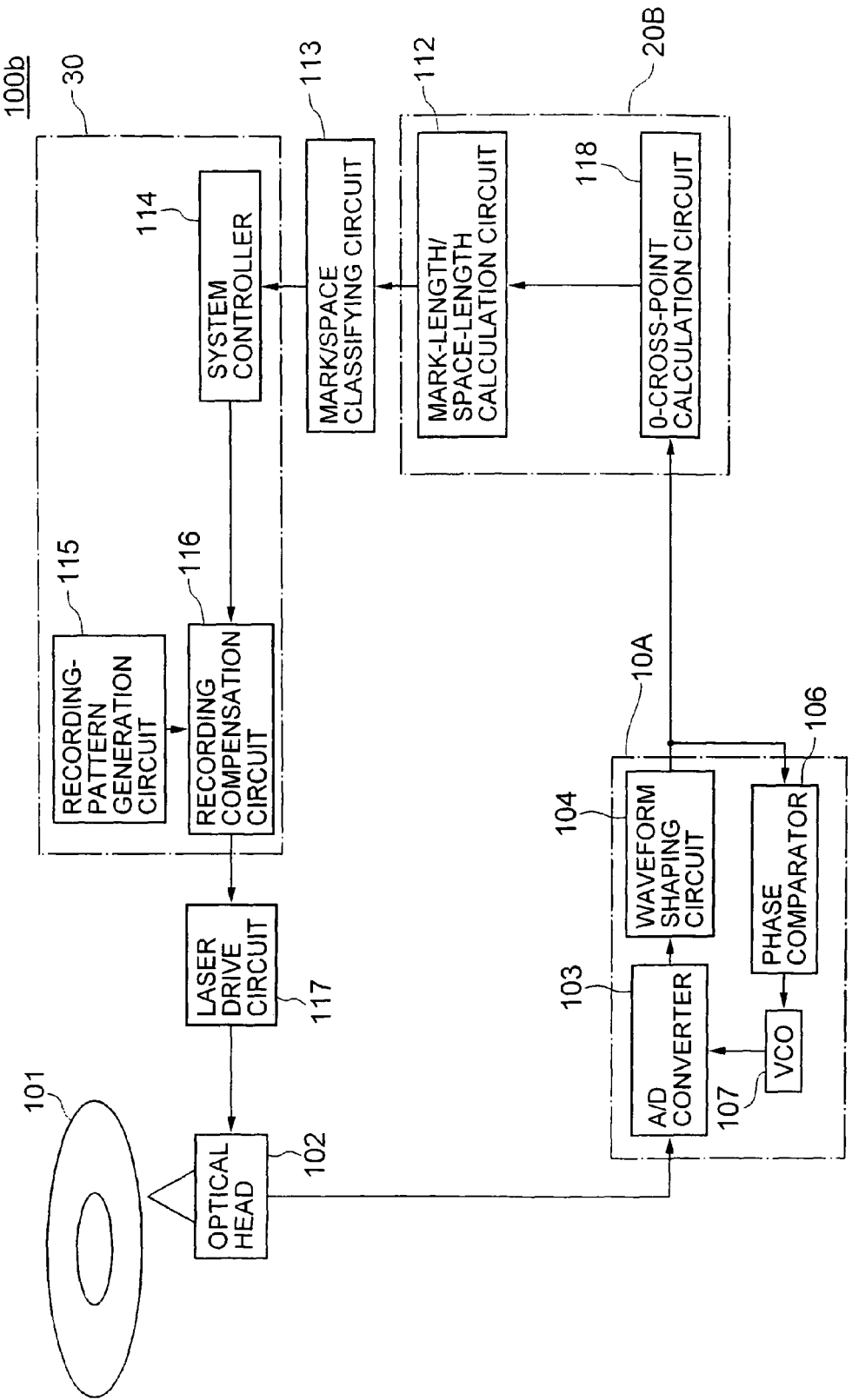
FIG. 8 is a block diagram of the configuration of an optical disc drive according to a third exemplary embodiment of the present invention.

FIG. 8 shows the configuration of an optical disk drive according to a third exemplary embodiment of the present invention. The optical disk drive 100b of this exemplary embodiment differs from the second exemplary embodiment of FIG. 6 in that it is formed by removing the adaptive equalization circuit 105 of the reproduced-waveform-information generation means 10 and the Viterbi-decoding circuit 108 of the conversion circuit 20A from the optical disk drive 100a of FIG. 6. In this exemplary embodiment, the 0-cross-point calculation circuit 118 estimates the time point when the waveform of the reproduced signal crosses the reference level (0-level) at the center of amplitude from the waveform of the reproduced signal that is output from the waveform shaping circuit 104. Otherwise, this exemplary embodiment is similar to the second exemplary embodiment.

In this exemplary embodiment, the 0-cross-point calculation circuit 118 estimates the time point when the waveform of the reproduced signal that is not PR-equalized crosses the 0-level and determines the shift quantity of the mark/space at the leading edge and the trailing edge thereof. Alternatively, the 0-cross-point calculation circuit 118 calculates the actual mark length/space length relative to the mark length/space length to be formed. With PR-equalization, as the waveform of the reproduced signal is made to agree with the waveform of the PR class it belongs, the waveform of the reproduced signal obtained after the PR-equalization (adaptive equalization data waveform) tends to swerve from the original waveform of the reproduced signal. This exemplary embodiment can accurately determine the mark length/space length by estimating the time point of crossing the 0-level, using the waveform of the reproduced signal that is not PR-equalized yet, and then calculating the mark length/space length by using the estimated time point. Otherwise, this exemplary embodiment provides advantages similar to those of the second exemplary embodiment.

When recording data on an optical disk, a recording pattern is generated by way of a DSV (digital sum value) process so as to hold the frequency of appearance of marks and spaces to a constant level. Then, as a result, the frequency of appearance of marks and spaces of the reproduced data is basically uniform relative to the reference level of the center of the ideal waveform or the reference level of the center of amplitude of the reproduced waveform. However, it should be noted that it is ideally so in a long term and the reproduced waveform may locally show irregular meandering or a state of inclusion of a DC component due to asymmetry. For this reason, when the mark length/space length is calculated with reference to the reference level of the center of the ideal waveform or the reference level of the center of amplitude of the reproduced waveform, the calculated mark length/space length may be deviated from the actual length.

It is sufficient for the first exemplary embodiment to measure the deviation of the above reference level and calculate the mark length/space length by taking the deviation into consideration for the purpose of avoiding the above-identified problem. For instance, the first exemplary embodiment may be so adapted as to accumulate the adaptive equalization waveforms (equalization errors) that are observed when the ideal waveform agrees with the central reference level for a predetermined period of time and divides the cumulative value by the number of samples that appear. Then, it determines the average of equalization errors that corresponds to the central reference level and corrects the equalization errors by the determined average to determine the mark length/space length. While the operation of determining the average of the equalization errors needs to be conducted before calculating the mark length/space length, the average cannot be determined until the predetermined time period elapses. Therefore, it may be so arranged that the average of the equalization errors that correspond to the central reference level is estimated from the average determined for the predetermined time period that immediately precedes the current time point and the mark length/space length may be calculated by using the former average. Alternatively, it may be so arranged that the equalization error average is determined for the proper predetermined time period and employed for determining the mark length/space length again for the same predetermined time period.

Figure 9:
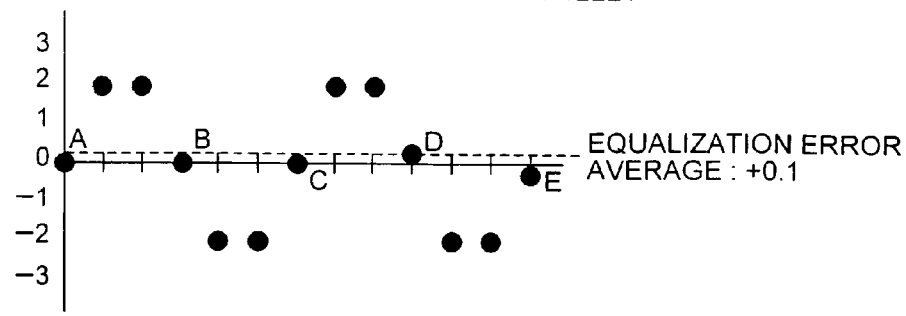
FIG. 9 is a waveform diagram showing a specific example of the adaptive equalization data.

Now, a specific example will be described below with reference to FIG. 9. It is assumed that the average of the equalization errors when the ideal waveform is at the central reference level is +0.1. It means that the adaptive equalization waveform shown in FIG. 9 is a waveform that is greater than the ideal waveform by +0.1. In such a case, it is sufficient to correct the adaptive equalization waveform so as to make each point of "+0.1" equal to "0". For example, if the values of points A, B and C are equal to "0" and the value of point D and that of point E are equal to "+0.2" and "−0.1", respectively, 0.1 is subtracted at these points from the adaptive equalization waveform to correct the values of points A, B and C to "−0.1" and the values of points D and E to "+0.1" and "−0.2", respectively. Thus, the mark length/space length can be correctly determined when the mark length/space length are calculated by using the adaptive equalization waveform that is corrected in this way.

It is sufficient for the second exemplary embodiment to calculate the mark length/space length by estimating the proper 0-level by means of the value that precedes the crossing of the adaptive equalization waveform and the 0-level and the value that succeeds the crossing and correcting the adaptive equalization waveform. The estimated value of the proper 0-level is determined by accumulating the values preceding the crossings where the adaptive equalization waveform passes the 0-level and those succeeding the crossings and dividing the cumulative value by the number of sample. Again, the central level cannot be determined until a predetermined time period elapses. Therefore, it may be so arranged that the value of the 0-level at the current time point is estimated from the estimated value of the 0-level for the predetermined time period that immediately precedes the current time point and employed for determining the mark length/space length. Alternatively, it may be so arranged that the value of the 0-level is estimated for the proper predetermined time period and employed for determining the mark length/space length again for the same predetermined time period. It is sufficient for the third exemplary embodiment to estimate the value of the 0-level by following a sequence similar to the sequence of the second exemplary embodiment for estimating the value of the 0-level and the mark length/space length is calculated by using the estimated value.

Figure 10:
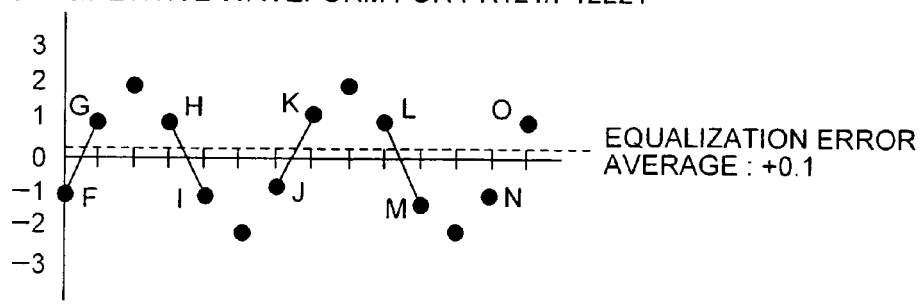
FIG. 10 is a waveform diagram showing another example of the adaptive equalization data.

Now, a specific example will be described with reference to FIG. 10. When estimating the proper value of the 0-level, the values of the adaptive equalization waveform at points F, G, H, I, J, K, L, M, . . . shown in FIG. 10 are accumulated and the cumulative value is the divided by the number of samples to determine the average. It is assumed here that the average is equal to +0.1. It means that the adaptive equalization waveform is a waveform that is greater than the ideal waveform by +0.1. In such a case again, it is sufficient to correct the adaptive equalization waveform so as to make each point of "+0.1" equal to "0".

For example, if the values of points F and I are equal to "−1" and the values of points G and H are equal to "+1) while the value of point J and that of point K are equal to "−0.9" and "1.1", respectively and the value of point L and that of point M are equal to "+1" and "−1.1", respectively, then 0.1 is subtracted at these points from the adaptive equalization waveform to correct the values of points F and I to "−1.1", those of points G and H to "+0.9", the value of point J to "−1", that of point K to "+1", that of point L to "+0.9" and that of point M to "−1.2". Thus, the more probable mark length/space length in the measuring period can be determined when the mark length/space length are calculated by using the adaptive equalization waveform that is corrected in this way.

Figure 11:
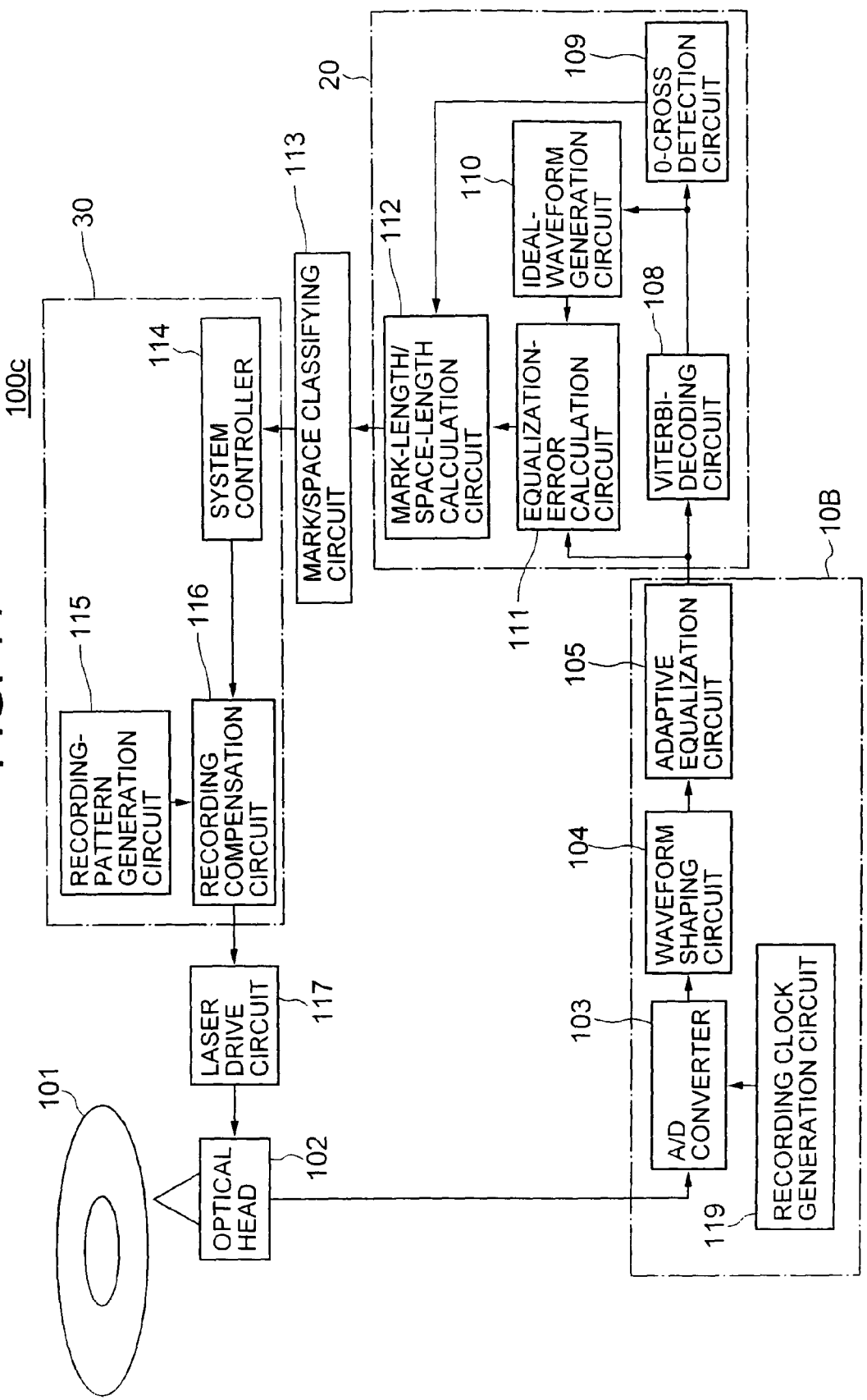
FIG. 11 is a block diagram of the configuration of an optical disc drive according to first modified example.

While the PLL is configured by the phase comparator 106 and the VCO 107, and the clock signal for controlling the phase difference between the periodic information obtained from the reproduced data and the sampling clock so as to minimize the same is supplied to the entire processing circuit including an A/D converter 103 in each of the above described exemplary embodiments, the configuration is by no means limited to this example. FIG. 11 shows the configuration of an optical disk drive 100c according to a first modification. As shown in FIG. 11, the reproduced-waveform-information generation means 10B includes a recording clock generation circuit 119 instead of the VCO 107 and the phase comparator circuit 106. The recording clock generation circuit 119 is adapted to generate a recording clock that allows recording to be synchronized with the operation of driving the disk by causing the clock to follow the synchronizing information obtained from the disk and supply the recording clock to the entire processing circuit including the A/D converter 103.

Figure 12:
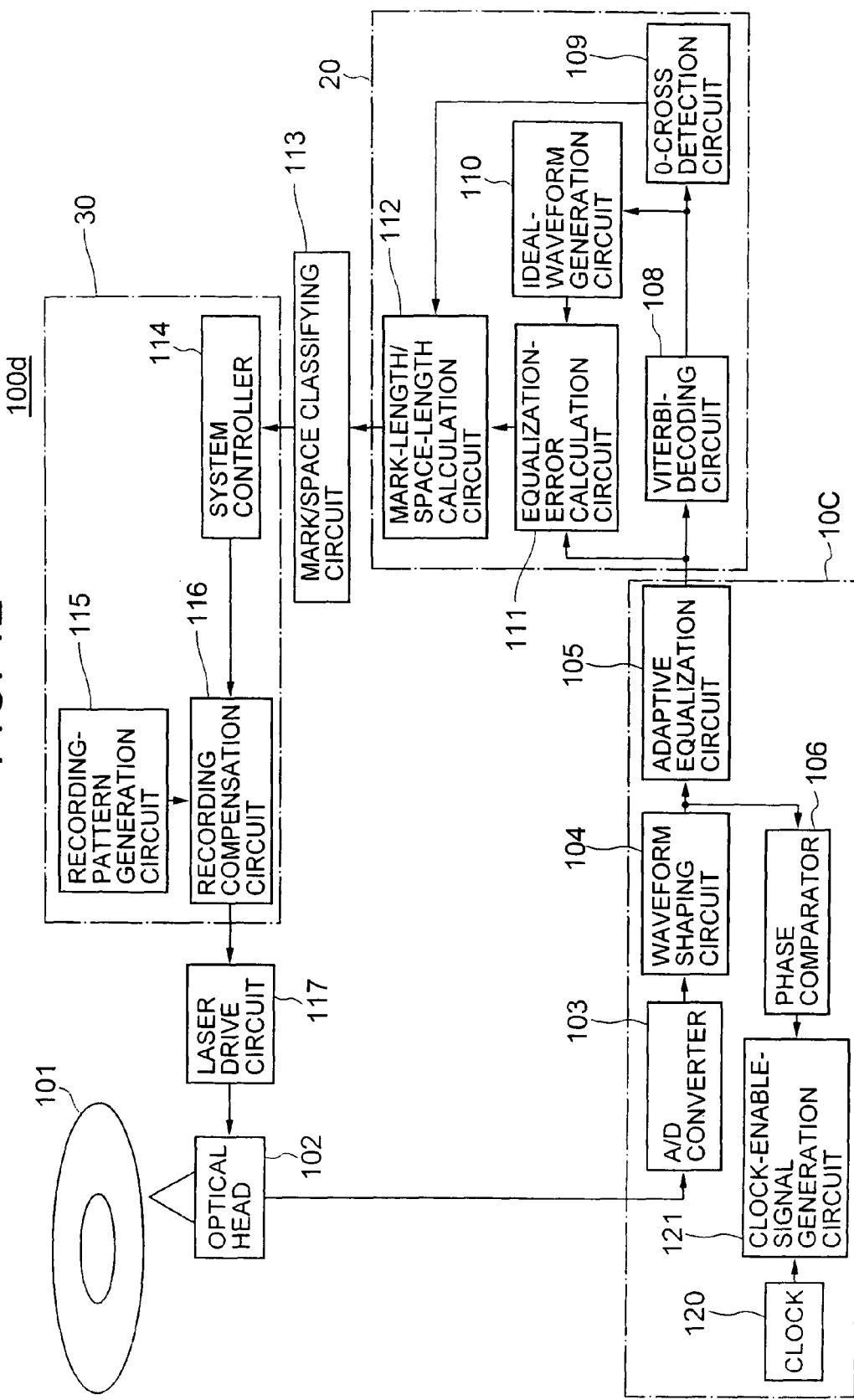
FIG. 12 is a block diagram of the configuration of an optical disc drive according to a second modified example.

FIG. 12 shows the configuration of an optical disk drive 100d of the second modification. The clock generation circuit 120 of the reproduced-waveform-information generation means 10C generates a clock signal having a frequency higher than the data rate of reproduction. The clock-enable-signal generation circuit 121 thins the clock signal generated by the clock generation circuit 120 based on the result of the phase comparison by the phase comparator 106 and allows the frequency thereof to agree with the data rate of reproduction before inputting the same to the A/D converter 103. Thus, a clock signal can be generated by means of such an arrangement. The first and second modifications may be formed not only from the first exemplary embodiment alone but also from the first exemplary embodiment as combined with the second and third exemplary embodiments.

With the optical information recording/reproduction apparatus and a recording condition adjusting method according to the exemplary embodiments of the present invention, at least either the shift quantity of the position of forming a mark/space at the leading edge and the trailing edge thereof or the mark length/space length is calculated based on reproduced waveform information that is a time series data, and the edge shift quantity of the leading edge and the trailing edge is adjusted when recording the mark/space based on the formational position shift quantity or the mark length/space length that is calculated. The formational position shift quantity or the mark length/space length can be calculated based on the error between the central level at the time point when the reproduced waveform information assumes the central level and the value of the reproduced waveform information if the reproduced waveform information assumes the central level in an ideal state. If, on the other hand, the reproduced waveform information assumes the central level not in an ideal state, the time point of crossing the central level can be estimated based on the values obtained before and after a change of the reproduced waveform information that takes place to cross the central level. According to the present invention, the edge shift quantity is adjusted by converting the reproduced waveform information into a formational position shift quantity in the direction of a time axis or a mark length/space length and a same technique is used for adjusting the formational position shift quantity or the mark length/space length regardless of whether the reproduced waveform information assumes the central level or not. In this way, according to the present invention, the recording conditions can be adjusted by a technique that is common to a case where the reproduced waveform information assumes the central level and a case where the reproduced waveform information does not get to the central level.

As described above, the present invention can take any of the following modes of realization.

For an optical information recording/reproduction apparatus according to the present invention, an arrangement of sampling the reproduced signal based on a predetermined sampling clock can be adopted for the reproduced-waveform-information generation means. Similarly, for a recording condition adjusting method according to the present invention, an arrangement of sampling the reproduced signal based on a predetermined sampling clock to generate reproduced waveform information can be adopted for the reproduced-waveform-information generation step. Then, the time series data of the sampled reproduced signal serves as reproduced waveform information.

For an optical information recording/reproduction apparatus according to the present invention, an arrangement where the conversion means includes a central-level-crossing-point calculation circuit for calculating the time point when the reproduced waveform information crosses the central level based on the values of the reproduced waveform information at time points before and after a change that occurs to the reproduced waveform information so as to cross the central level indicating the median value of the amplitude of the reproduced waveform information and a mark-length/space-length calculation circuit for computing at least either the formational position shift quantity or the mark length/space length based on the time point of crossing the central level can be adopted. Similarly, for a recording condition adjusting method according to the present invention, an arrangement where the time length-calculation step includes a step of calculating the time point when the reproduced waveform information crosses the central level based on the values of the reproduced waveform information at time points before and after a change that occurs to the reproduced waveform information so as to cross the central level indicating the median value of the amplitude of the reproduced waveform information and a step of calculating at least either the formational position shift quantity or the mark length/space length based on the time point of crossing the central level can be adopted. If the reproduced waveform information does not get to the central level, the time point of crossing the central level can be estimated from the values obtained before and after a change that takes place to cross the central level, and the reproduced waveform information in time series is converted to information relating to a length in a time axis direction. With such an arrangement, it is possible to calculate the shift quantity of the position of forming a mark/space and the actual mark length/space length relative to the mark to be formed and then it is possible appropriately adjust the edge shift quantity at the leading edge and the trailing edge of the mark/space.

An arrangement of calculating the average of the values of the reproduced waveform information at time points before and after a change in the reproduced waveform information that takes place to cross the central level in a predetermined time period, correcting the reproduced waveform information or the central level based on the calculated average and calculating the time point of crossing the central level based on the reproduced waveform information or the central level after the correction can be adopted for an optical information recording/reproduction apparatus and a recording condition adjusting method according to the present invention. The frequency of appearance of marks and spaces of the reproduced waveform information is expected to be uniform relative to the central level in a long term. However, the reproduced waveform may locally show irregular meandering or a state of inclusion of a DC component due to asymmetry. If such is the case, the time point when the reproduced waveform information crosses the central level can be accurately determined by determining the magnitude of the DC component from the average of the values obtained before and after a change in the reproduced waveform information that takes place to cross the central level and taking the level of the DC component for the central level.

An arrangement of using PRML (partial response most likelihood) detection for reproducing data and also a PR class that does not necessarily assume the central reference level at the time of transition from a mark to a space or vice versa if an ideal waveform is generated for ideal reproduced waveform information that can be assumed from the PR class to be used based on the binarized data obtained by binarizing the reproduced waveform information but for which the time point of crossing the central reference level can be calculated based on the reproduced waveform information obtained after PR-equalization can be adopted for an optical information recording/reproduction apparatus and a recording condition adjusting method according to the present invention. As pointed out above, an arrangement of calculating the time point of crossing the central level based on the reproduced waveform information obtained after PR-equalization can be adopted for the purpose of the present invention. Alternatively, an arrangement of calculating the time point of crossing the central level based on the reproduced waveform information obtained without PR-equalization can be adopted for the purpose of the present invention.

In the arrangement of the optical information recording/reproduction apparatus according to the present invention, a configuration may be employed wherein PRML detection is employed for reproducing the data; a PR class is employed for which the ideal waveform assumes the central reference level at any time of transition from a mark to a space or vice versa when an ideal waveform is generated, as ideal reproduced waveform information assumed from the employed PR class, based on the binarized data obtained by binarizing the reproduced waveform information; the conversion unit includes: an ideal-waveform generation circuit that generates an ideal waveform; an equalization-error calculation circuit that calculates the equalization error between the reproduced waveform information after PR-equalization and the ideal waveform; and a mark-length/space-length calculation circuit that calculates at least one of the formational position shift quantity and the mark length/space length based on the equalization error at the time when the ideal waveform assumes the central reference level. In the arrangement of the method of adjusting the recording conditions of the present invention, a configuration may be employed wherein PRML detection is employed for reproducing data, and a PR class is employed for which the ideal waveform assumes the central reference level at any time of transition from a mark to a space or vice versa when an ideal waveform is generated, as ideal reproduced waveform information assumed from the employed PR class, based on the binarized data obtained by binarizing the reproduced waveform information; and the time length-calculation step includes the steps of: generating an ideal waveform; calculating the equalization error between the reproduced waveform information after PR-equalization and the ideal waveform when the ideal waveform assumes the central reference level; and calculating at least one of the formational position shift quantity and the mark length/space length based on the calculated equalization error.

An arrangement of calculating the average of the equalization errors that arise when the ideal waveform assumes the central reference level in a predetermined time period, correcting the calculated equalization error or the central reference level by using the calculated average and calculating at least either the formational position shift quantity or the mark length/space length based on the equalization error or the central reference level after the correction can be adopted for an optical information recording/reproduction apparatus and a recording condition adjusting method according to the present invention. The frequency of appearance of marks/spaces of the reproduced waveform information is expected to be uniform relative to the central level in a long term. However, the reproduced waveform may locally show irregular meandering or a state of inclusion of a DC component due to asymmetry. If such is the case, the influence of the DC component of the reproduced waveform information can be eliminated and the equalization error can be correctly determined by computing the average of the equalization errors that arise when the ideal waveform assumes the central reference level and correcting the reproduced waveform by using the average.

An arrangement of calculating the formational position shift quantity of the mark/space at the leading edge and the trailing edge thereof based on the equalization error that arises when the ideal waveform assumes the central reference level and the transition quantity from the level at the time point immediately preceding the time point when the ideal waveform assumes the central reference level to the central reference level or the transition quantity from the central reference level to the level at the time point immediately succeeding the time point when the ideal waveform assumes the central reference level can be adopted for an optical information recording/reproduction apparatus and a recording condition adjusting method according to the present invention. The transition quantity (the variation of value) that arises when the ideal waveform assumes the central level varies as a function of the PR class. The formational position shift quantity can be calculated for each PR class based on the ratio of the equalization error that arises when the ideal waveform assumes the central level to the transition quantity at the time of transition to the central reference level.

An arrangement of additionally providing a classification means for classifying the formational position shift quantities or the mark lengths/space lengths calculated by the conversion means for each mark length/space length and making the adjustment means compute the average of the formational position shift quantities or the mark lengths/space lengths that are calculated for each of the classified mark lengths/space lengths and adjust the edge shift quantity of the leading edge and the trailing edge of the mark/space by using the calculated average can be adopted for an optical information recording/reproduction apparatus according to the present invention. If such is the case, the edge shift quantity of the leading edge and the trailing edge of the mark/space can be determined for each mark length/space length by classifying the calculated formational position shift quantities for each mark/space and the recording conditions can be appropriately adjusted when forming each mark length/space length.

An arrangement of making the classification means classify the calculated mark lengths/space lengths by each predetermined combination of mark length/space length and the adjustment means compute the average of the formational position shift quantities or the mark lengths/space lengths that are calculated for each combination of the classified mark length/space length and adjust the edge shift quantity of the leading edge and the trailing edge of the mark/space by using the calculated average can be adopted for an optical information recording/reproduction apparatus according to the present invention. The recording conditions can be adjusted more finely by such an arrangement.

While the present invention is described above by way of preferred exemplary embodiments, the present invention is by no means limited to the above-described exemplary embodiments of optical information recording/reproduction apparatus and recording condition adjusting method, which may be modified and/or altered without departing from the scope of the present invention.

This application is based upon and claims the benefit of priority from the prior Japanese Patent Application No. 2006-183379, field on Jul. 3, 2006, the entire contents of which are incorporated herein by reference.

The invention claimed is:

1. An optical information recording/reproduction apparatus for recording data as combinations of marks and spaces on an information recording medium and reproducing the data from the information recording medium, comprising:
   a reproduced-waveform-information generation unit that generates reproduced waveform information based on a reproduced signal read out from the information recording medium;
   a conversion unit that calculates at least one of a formational position shift quantity of a leading edge and a trailing edge of a mark/space formed on the information recording medium and a mark length/space length based on the reproduced waveform information; and
   an adjustment unit that adjusts an edge shift quantity of the leading edge and the trailing edge of the mark/space at the time of recording based on said at least one of the calculated formational position shift quantity and the mark length/space length,
   wherein said conversion unit:
   employs a PRML detection for reproducing the data;
   employs a PR class for which the ideal waveform assumes the central reference level at any time of transition from a mark to a space or vice versa when an ideal waveform is generated, as ideal reproduced waveform information assumed from the employed PR class, based on the binarized data obtained by binarizing the reproduced waveform information, said conversion unit includes:
   an ideal-waveform generation circuit that generates an ideal waveform;
   an equalization-error calculation circuit that calculates the equalization error between the reproduced waveform information after PR-equalization and the ideal waveform; and
   a mark-length/space-length calculation circuit that calculates at least one of the formational position shift quantity and the mark length/space length based on the equalization error at the time when the ideal waveform assumes the central reference level,
   said mark-length/space-length calculation circuit calculates the formational position shift quantity of the mark/space at the leading edge or the trailing edge thereof based on a ratio of the equalization error that arises when the ideal waveform assumes the central reference level to a transition quantity that arises when the ideal waveform shifts from the level at the time point immediately preceding the time point when the ideal waveform assumes the central reference level or when the ideal waveform shifts from the central reference level to the level at the time point immediately succeeding the time point when the ideal waveform assumes the central reference level.

2. The optical information recording/reproduction apparatus according to claim 1, further comprising a classification unit that classifies the shift quantities of the positions of forming marks/spaces or the mark lengths/space lengths calculated by said conversion unit for each mark length/space length, wherein:
   said adjustment unit calculates the average of the calculated formational shift quantities of the marks/spaces or the mark lengths/space lengths that are classified for each mark length/space length, and adjusts the edge shift quantity of the mark/space at the leading edge and the trailing edge thereof by using the calculated average.

3. The optical information recording/reproduction apparatus according to claim 2, wherein:
   said adjustment unit calculates the average of the calculated formational shift quantities of the marks/spaces or the mark lengths/space lengths that are classified for each combination of mark length/space length, and adjusts the edge shift quantity of the mark/space at the leading edge and the trailing edge thereof by using the calculated average.

4. A method of adjusting recording conditions of an optical information recording/reproduction apparatus for recording data as combinations of marks and spaces on an information recording medium and reproducing the data from the information recording medium, comprising:

a reproduced-waveform-information generation step of reading a reproduced signal from the information recording medium to generate reproduced waveform information based on the reproduced signal read out from the information recording medium;

a time-length calculation step of calculating at least one of the formational position shift quantity of the leading edge and the trailing edge of the mark/space formed on said information recording medium and the mark length/space length based on the reproduced waveform information; and an adjustment step for adjusting the edge shift quantity of the leading edge and the trailing edge of said mark/space at the time of recording based on at least one of the calculated formational position shift quantity and the mark length/space length, wherein:

a PRML detection is employed for reproducing data, and a PR class is employed for which the ideal waveform assumes the central reference level at any time of transition from a mark to a space or vice versa when an ideal waveform is generated, as ideal reproduced waveform information assumed from the employed PR class, based on the binarized data obtained by binarizing the reproduced waveform information;

said time length-calculation step comprises the steps of: generating an ideal waveform; calculating the equalization error between the reproduced waveform information after PR-equalization and the ideal waveform when the ideal waveform assumes the central reference level; and calculating at least one of the formational position shift quantity and the mark length/space length based on the calculated equalization error;

said step of calculating the formational position shift quantity calculates the formational position shift quantity of the mark/space at the leading edge or the trailing edge thereof based on the ratio of the equalization error that arises when the ideal waveform assumes the central reference level to the transition quantity that arises when the ideal waveform shifts from the level at the time point immediately preceding the time point when the ideal waveform assumes the central reference level or when the ideal waveform shifts from the central reference level to the level at the time point immediately succeeding the time point when the ideal waveform assumes the central reference level.

* * * * *